Oct. 11, 1960   R. W. CUSHMAN   2,956,167
MEASURING AND CONTROL APPARATUS
Filed Jan. 29, 1957

INVENTOR
Robert W. Cushman
BY
Curtis Morris & Safford
ATTORNEYS

United States Patent Office 2,956,167
Patented Oct. 11, 1960

2,956,167
MEASURING AND CONTROL APPARATUS

Robert W. Cushman, Sharon, Mass., assignor to The Foxboro Company, Foxboro, Mass., a corporation of Massachusetts Filed Jan. 29, 1957, Ser. No. 636,937

8 Claims. (Cl. 250—83.6)

This invention relates to means for automatically measuring and controlling a physical characteristic, e.g. thickness or weight, of a moving strip of material. More particularly, this invention relates to apparatus adapted to measure the average unit weight of a strip of paper while the paper is being transported during normal production processes.

One of the difficulties encountered in measuring and controlling the unit weight of paper in a paper mill is that, in conventional production processes, the weight of the paper fluctuates rapidly within a small range. These fluctuations in paper weight do not adversely affect the quality of the product, and hence it is not particularly important that they be eliminated. However, a conventional measuring and control system which is sufficiently sensitive to respond to small variations which occur over a relatively long time period will also respond to the small rapid fluctuations which take place as a part of the normal production processes. Such a system will tend to be unstable because of the relatively long transportation time lag between the region where the control effect is experienced and the region of the paper strip where the measurement is made. For this and other reasons it is important to provide a measuring and control system which is sufficiently sensitive to detect small variations occuring over a relatively long period of time, but is not responsive to such variations which occur rapidly as part of normal production processes.

Accordingly, it is an object of the present invention to provide measuring and control apparatus, for use with moving strips of material, which is superior to such apparatus provided heretofore. It is a further object of this invention to provide such apparatus that measures the average unit weight of a moving strip of material over a relatively long period of time. It is a still further object of this invention to provide such a measuring system that is especially adapted for use with a highly-sensitive paper-weight detector of the radiation type. Other objects, advantages and aspects of the present invention will be in part apparent from, and in part pointed out in, the following description considered together with the accompanying drawing in which:

Figure 1:
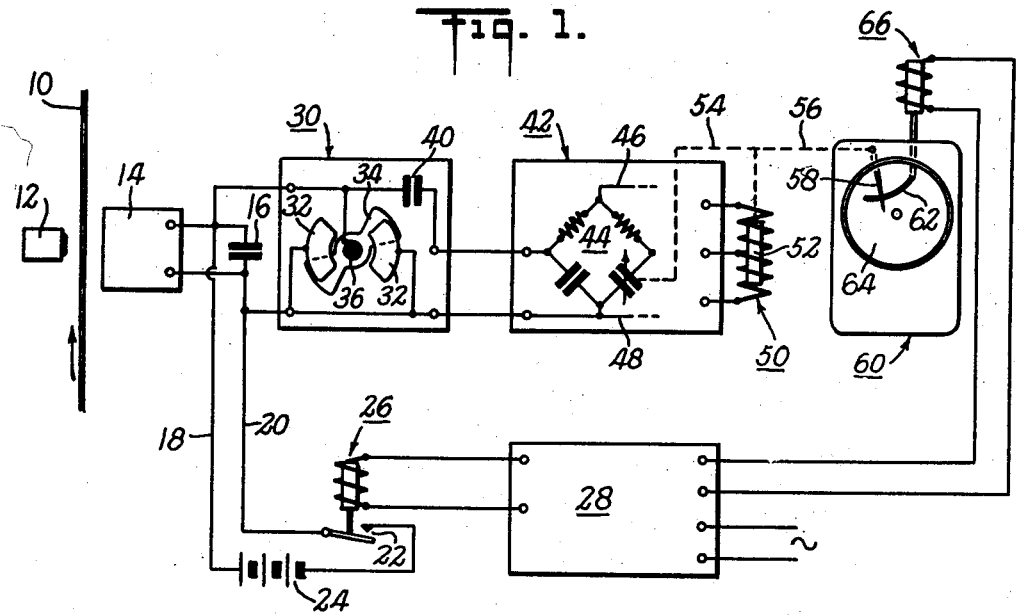
Figure 1 is a schematic diagram of an embodiment of the present invention.

Referring now to the upper left-hand corner of Figure 1, there is shown a moving strip of paper 10 which is part of a long run of paper as in a paper mill. On one side of this strip of paper is a radioactive source 12, e.g. thallium, which radiates beta rays towards and through the paper. On the other side of the paper is a detector 14, e.g. of the type shown in U.S. Patent 2,696,-564 (Ohmart). This detector can be considered from an electrical standpoint as a variable resistor which, when suitably energized, develops a flow of current in accordance with the amount of radiation reaching it from the source 12; the amount of radiation is in turn determined by the thickness (or weight) of the paper 10.

Connected to the terminals of the radiation detector 14 is a capacitor 16. Also connected to the terminals of this detector is a pair of wires 18 and 20 which lead through a set of switch contacts 22 to a battery 24 having a potential of 300 volts. When the switch contacts are closed, the capacitor 16 is rapidly charged to the potential of the battery, i.e. within a fraction of a second.

The switch contacts 22 are operated by a relay 26 which is periodically energized by a timer unit indicated in block form at 28. In the cycle of operations controlled by the timer, the contacts 22 are momentarily closed to charge up the capacitor 16, and then are opened for a relatively long period of time, e.g. three minutes, at the end of which the contacts again are closed. While the contacts are open, the capacitor 16 discharges through the detector 14, at an instantaneous rate determined by the thickness of the portion of paper disposed between the source 12 and the detector. Consequently, the voltage across the capacitor at the end of the discharge period is an "integrated" measure of the thickness of the paper that has moved by the detector during this period. If the average paper thickness decreases over this period, the capacitor voltage at the end of the period will correspondingly be decreased, and vice versa.

To measure the voltage across the capacitor 16 at the end of the discharge period, the capacitor is connected to a voltmeter diagrammatically indicated at 30. This voltmeter is of the electrostatic type as shown in U. S. application Serial No. 570,843, now Patent No. 2,910,649, filed on March 12, 1956, and includes a set of fixed plates 32 connected to the lower input terminal and a set of rotatable plates 34 connected to the upper input terminal. The rotatable plates are normally biased away from the fixed plates by a small spiral spring 36. The capacitance formed by the two sets of plates is charged up to the voltage across the detector, and the plates are attracted towards each other by the electrostatic force produced by this voltage. Consequently, the rotatable plates take a position such that the electrostatic force of attraction is balanced by the bias force of the spiral spring 36.

As the voltage across the capacitor 16 gradually decays due to the beta ray radiation received from the source 12, the electrical capacitance between the plates 30 and 32 slowly diminishes. These plates are connected through a coupling capacitor 40 to a capacity-measuring device generally indicated in block form at 42, in accordance with the details set forth in the above-mentioned copending application. This device includes a balancing impedance bridge 44 comprising a pair of resistors, a fixed capacitor, and a variable capacitor.

The bridge 44 is energized in a conventional manner by A.-C. supply means (not shown), and any unbalance of the bridge produces an output signal across a pair of leads 46 and 48 which are connected to amplifying and phase-sensitive apparatus as described in the above-mentioned copending application. The resulting D.-C. output of this apparatus is fed to a rebalancing solenoid motor 50 including a movable core 52. This core is mechanically connected by a linkage 54 to the variable capacitor of the bridge. As the core moves in response to an unbalance signal from the bridge, the variable capacitor is readjusted to a value such that the bridge again is balanced, at which time the core ceases to move. Thus, as the voltage across the capacitor 16 drops off, the resulting change of capacitance between the voltmeter plates 32 and 34 tends to unbalance the bridge, and the core gradually shifts position to maintain the bridge in balance.

The core 52 also is connected by a linkage 56 to the movable pen 58 of a recorder shown partially and schematically at 60. A lever arm 63 is provided to normally hold this pen away from the paper chart 64 positioned immediately beneath the pen, so that no record is made of the continuous variation in voltage across the capacitor 16 while it is discharging.

The lever arm 62 is controlled by a print solenoid 66 the armature of which moves the lever arm so as to permit the pen 58 to make a mark on the chart 64. This solenoid 66 is energized momentarily at the end of the capacitor discharge period, and immediately before the switch contact 22 is closed to recharge the capacitor 16. Accordingly, the chart is marked to indicate the value of the voltage across this capacitor at the end of the predetermined discharge time interval. Since the value of this voltage is determined by the average rate of discharge of the capacitor, which in turn is determined by the average unit thickness of the paper strip 10, the mark made by the recorder pen represents an "integrated" measure of the paper thickness during the discharge period.

Immediately after the print solenoid 66 has been actuated by the timer 28, the timer energizes the relay 26 to close the switch contacts 22 momentarily and recharge the capacitor 16. Accordingly, the pen 58 is returned to its initial position and the cycle is repeated to allow the capacitor voltage to decay gradually so as again to bring the recorder pen to a position representing an integrated measure of the paper thickness over this subsequent period of time.

It also should be noted that certain radiation detectors (such as the one described in the above Ohmart patent) have inherent electrical capacitance between the output terminals thereof, due to the internal construction of the device. In some cases, this internal capacitance will be sufficiently large that the external capacitor 16 can be eliminated.

Figure 2:
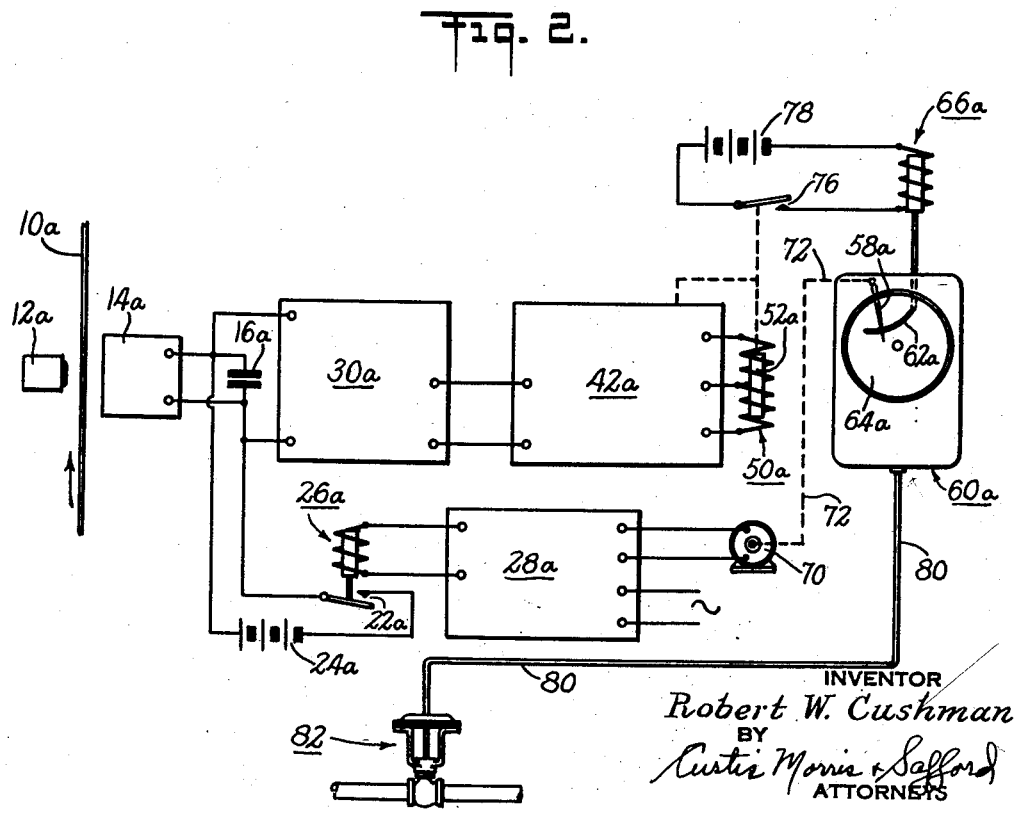
Figure 2 is a schematic diagram of a modified arrangement based on the present invention.

Figure 2 shows an alternate embodiment based on the same broad principles. Here, a source 12a radiates through a paper strip 10a to a detector 14a, with the capacitor 16a being charged up initially from a battery 24a by the momentary closure of contacts 22a, all as described with reference to Figure 1. Similarly, the potential across the capacitor is measured by an electrostatic voltmeter 30a and a capacity-measuring device 42a which drives the core 52a of a rebalancing solenoid 50a.

However, in this arrangement, the pen 58a of the recorder 60a is driven by a constant-speed motor 70 connected thereto by a linkage 72. This motor is energized by the timer 28a at the instant the switch contacts 22a are opened by the relay 26a, so that, as the detector voltage decays, the pen moves at constant speed across the face of the chart 64a. During this movement, the pen is held away from the chart by lever arm 62a. When the voltage has dropped to a predetermined level, e.g. 100 volts, the solenoid core 52a closes a set of contacts 76 to energize the print solenoid 66a from a battery 78.

Consequently, the pen makes a mark on the chart indicating the length of time required for the capacitor voltage to drop from its initial charge level to the predetermined lower level. This time is determined by the average rate of discharge, which in turn is determined (as explained above) by the average thickness of the paper over the measurement time interval.

Preferably, the contacts 76 are of the momentary-closure type, so that continued rotation of the motor 70 will not produce a long mark on the chart. After the mark has been made, the timer 28a subsequently deactivates the motor and brings it back to its initial starting position by any conventional means (not shown). When the cycle has thus been completed, the timer again energizes the charge relay 26a momentarily, and then reactivates the drive motor to start the pen moving across the face of the chart as the voltage across the radiation detector gradually decays.

The recorder 60a also is provided with conventional control apparatus which is activated each time the print solenoid 66a is energized. When the average paper thickness deviates from the desired value, this control apparatus sends a control signal through line 80 to a valve 82 which operates to readjust the production process to maintain the desired thickness.

Although specific preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Apparatus for measuring a physical characteristic of a moving strip of material comprising, in combination, a capacitive element, voltage supply means for charging said capacitive element to a predetermined voltage, timing means including switch means arranged to periodically connect said voltage supply means to said capacitive element for charging said element to a fixed potential, means for opening said switch means for a time interval after said capacitive element has been charged by said voltage supply means, sensing means adapted to be mounted adjacent said moving strip of material, said sensing means including electrical means arranged to pass current in accordance with the magnitude of an input signal, a signal-producing device controllable by said physical characteristic to produce a signal in accordance therewith, said signal-producing device being arranged to feed said signal to said electrical means to control the current passing therethrough, circuit means for connecting said electrical means to said capacitive element during said time interval to draw the charge therefrom at a rate determined by said physical characteristic, voltage-responsive means coupled to said capacitive element, and indicating means under the control of said voltage-responsive means to produce at the end of said time interval an indication of the average rate of discharge of said capacitive element during said time interval.

2. Apparatus for measuring a physical characteristic of a moving strip of material comprising, in combination, a capacitive element, voltage supply means for charging said capacitive element to a predetermined voltage, switch means arranged to periodically connect said voltage supply means to said capacitive element, timing means for opening said switch means for a predetermined fixed time interval after said capacitive element has been charged by said voltage supply means, a sensing unit including a signal-producing device comprising a source of radiation and a radiation-responsive element, said sensing unit being adapted to be mounted adjacent said moving strip of material and arranged to pass electric current in accordance with said physical characteristic, circuit means connecting said sensing unit to said capacitive element during said predetermined time interval to draw the charge therefrom at a rate determined by said physical characteristic, voltage-responsive means coupled to said capacitive element, and indicating means under the control of said voltage-responsive means to produce an indication of the magnitude of the voltage across said capacitive means at the end of said predetermined time interval.

3. Apparatus for measuring the average weight of a moving strip of material comprising, in combination, a capacitive element, voltage supply means for charging said capacitive element to a predetermined voltage, switch means arranged to periodically connect said voltage supply means to said capacitive element, timing means for opening said switch means for a predetermined fixed time interval after said capacitive element has been charged by said voltage supply means, a radioactive source mounted adjacent one side of said moving strip of material, a radiation detector mounted adjacent the other side of said strip to produce a current flow in accordance with the weight of the portion of said material between said source and said detector, said detector being coupled to said capacitive element during said predetermined time interval to continuously draw current therefrom at a rate determined by the weight of said material, voltage-responsive means coupled to said capacitive element, and indicating means under the control of said voltage-responsive means to produce an indication of the magnitude of the voltage across said capacitive means at the end of said predetermined time interval.

4. Apparatus for measuring a physical characteristic of a moving strip of material comprising, in combination, a capacitive element, voltage supply means for charging said capacitive element to a predetermined voltage, switch means arranged to periodically connect said voltage supply means to said capacitive element, timing means for opening said switch means for a predetermined fixed time interval after said capacitive element has been charged by said voltage supply means, a sensing unit including a signal-producing device comprising a source of radiation and a radiation-responsive element, said sensing unit being adapted to be mounted adjacent said moving strip of material and arranged to produce a current flow in accordance with a physical characteristic of said material, said sensing unit being coupled to said capacitive element during said predetermined time interval to draw current therefrom at a rate determined by said physical characteristic, voltage-responsive means coupled to said capacitive element and including a capacitor the capacitance of which varies with the voltage of said capacitive element, and capacity-responsive indicating means coupled to said capacitor to produce an indication of the magnitude of the voltage across said capacitive element at the end of said predetermined time interval.

5. Apparatus for measuring a physical characteristic of a moving strip of material comprising, in combination, a capacitive element, voltage supply means for charging said capacitive element to a predetermined voltage, timing means including first switch means arranged to periodically connect said voltage supply means to said capacitive element, means for opening said first switch means after said capacitive element has been charged by said voltage supply means, a sensing unit including a signal-producing device comprising a source of radiation and a radiation-responsive element, said sensing unit being adapted to be mounted adjacent said moving strip of material and arranged to produce a current flow in accordance with a physical characteristic of said material, said sensing unit being coupled to said capacitive element while said first switch is open to draw current therefrom at a rate determined by said physical characteristic, voltage-responsive means coupled to said capacitive element and including second switch means operable when the voltage across said capacitive element has dropped to a predetermined level, and indicating means under the joint control of said timing means and said voltage-responsive means to produce an indication of the duration of the time interval between the opening of said first switch means and the operation of said second switch means.

6. Apparatus for measuring a physical characteristic of a moving strip of material comprising, in combination, a capacitive element, voltage supply means for charging said capacitive element to a predetermined voltage, timing means including first switch means arranged to periodically connect said voltage supply means to said capacitive element, means for opening said first switch means for a period of time after said capacitive element has been charged by said voltage supply means, a sensing unit including a source of radiation and a radiation-responsive device, said sensing unit being adapted to be mounted adjacent said moving strip of material and arranged to produce a current flow in accordance with a physical characteristic of said material, said sensing unit being coupled to said capacitive element while said first switch is open to draw current therefrom at a rate determined by said physical characteristic, voltage-responsive means coupled to said capacitive element and including second switch means operable when the voltage across said capacitive element has dropped to a predetermined level, a constant-speed motor under the control of said timing means and started thereby when said first switch is opened, indicating means driven by said motor and operable by said second switch means to produce an indication of the time interval between the opening of said first switch means and the operation of said second switch means.

7. Apparatus for measuring a physical characteristic of a moving strip of material comprising, in combination, a capacitive element, voltage supply means for charging said capacitive element to a predetermined voltage, timing means including first switch means arranged to periodically connect said voltage supply means to said capacitive element for charging said element to a fixed potential, means for opening said switch means for a time interval after said capacitive element has been charged by said voltage supply means, a sensing unit including a source of radiation and a radiation-responsive device, said sensing unit being adapted to be mounted adjacent said moving strip of material and arranged to pass electric current in accordance with said physical characteristic, circuit means for connecting said sensing unit to said capacitive element to draw the charge therefrom during said time interval at a rate determined by said physical characteristic, voltage-responsive means coupled to said capacitive element and including a capacitor the capacitance of which varies in accordance with the voltage across said capacitive element, capacity-responsive means coupled to said capacitor and including motor drive means positionable in accordance with the capacitance of said capacitor, second switch means under the control of said motor drive means and operable when the level of voltage across said capacitive element drops to a predetermined value, and indicating means under the joint control of said timing means and said second switch means to produce an indication of the length of the time interval between the opening of said first switch means and the operation of said second switch means.

8. Apparatus for controlling a physical characteristic of a moving strip of material comprising, in combination, a capacitive element, voltage supply means for charging said capacitive element to a predetermined voltage, switch means arranged to periodically connect said voltage supply means to said capacitive element, timing means for opening said switch means for a time interval after said capacitive element has been charged by said voltage supply means, a sensing unit including a signal-producing device comprising a source of radiation and a radiation-responsive element, said sensing unit being adapted to be mounted adjacent said moving strip of material and arranged to pass electric current in accordance with said physical characteristic, circuit means connecting said sensing unit to said capacitive element during said time interval to draw the charge therefrom at a rate determined by said physical characteristic, voltage-responsive means coupled to said capacitive element, operating means for varying said physical characteristic in the portions of said moving strip of material which have not yet reached said sensing unit, and control means actuable by said voltage-responsive means and arranged to control said operating means in accordance with the average rate of discharge of said capacitive-element during said time interval.

References Cited in the file of this patent
UNITED STATES PATENTS

| | | |
|---|---|---|
| 2,676,270 | Lahti | Apr. 20, 1954 |
| 2,788,896 | Coleman | Apr. 16, 1957 |
| 2,803,405 | Howell | Aug. 20, 1957 |